(12) United States Patent
Feng et al.

(10) Patent No.: US 11,159,100 B2
(45) Date of Patent: Oct. 26, 2021

(54) MODIFIED MODULATED WAVE ACQUISITION METHOD AND MODEL PREDICTIVE CONTROL METHOD FOR SINGLE-PHASE CASCADED H-BRIDGE RECTIFIER

(71) Applicant: Southwest Jiaotong University, Chengdu (CN)

(72) Inventors: Xiaoyun Feng, Chengdu (CN); Chenglin Xiong, Chengdu (CN); Rong Mei, Chengdu (CN); Shuang Song, Chengdu (CN); Zhiwei Song, Chengdu (CN); Lu Huang, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 16/996,927

(22) Filed: Aug. 19, 2020

(65) Prior Publication Data

US 2021/0265921 A1 Aug. 26, 2021

(30) Foreign Application Priority Data

Feb. 25, 2020 (CN) .......................... 202010116778.4

(51) Int. Cl.
*H02M 7/539* (2006.01)
*H02M 1/00* (2006.01)
(Continued)

(52) U.S. Cl.
CPC ............ *H02M 7/539* (2013.01); *G05B 17/02* (2013.01); *H02M 1/00* (2013.01); *H02M 1/0022* (2021.05);
(Continued)

(58) Field of Classification Search
CPC ...... H02M 1/00; H02M 1/0022; H02M 1/007; H02M 7/539; H02M 7/5387; H02M 7/25; G05B 17/02
See application file for complete search history.

(56) References Cited

U.S. PATENT DOCUMENTS

2015/0295506 A1* 10/2015 Inomata ................ H02M 5/293
323/282

* cited by examiner

*Primary Examiner* — Adolf D Berhane
(74) *Attorney, Agent, or Firm* — Bayramoglu Law Offices LLC

(57) ABSTRACT

A modified modulated wave acquisition method includes: obtaining a modulated wave $u_{aba}$; calculating a difference between the given value $i_{Nq}{*}$ and the actual value $i_{Nq}$ of the q-axis component of a grid side current, inputting the result to a proportional integral (PI) controller, and multiplying an output of the PI controller by cos ωt to obtain a modulated wave offset $\Delta u_{aba}$; and calculating a difference between the modulated wave $u_{aba}$ and the modulated wave offset $\Delta u_{aba}$ to obtain a modified modulation wave $u_{aba}{'}$, where ωt is a grid voltage phase in a sinusoidal case. The MPC method for a single-phase cascaded H-bridge rectifier includes: obtaining the modified modulated wave $u_{aba}{'}$, where the component $i_{Nq}{*}$ is 0; and replacing the modulated wave $u_{aba}$ with the modified modulated wave $u_{aba}{'}$ to perform MPC for the single-phase cascaded H-bridge rectifier.

9 Claims, 6 Drawing Sheets

(51) Int. Cl.
*G05B 17/02* (2006.01)
*H02M 7/5387* (2007.01)
*H02M 7/25* (2006.01)

(52) U.S. Cl.
CPC .......... *H02M 7/5387* (2013.01); *H02M 1/007* (2021.05); *H02M 7/25* (2013.01)

MODIFIED MODULATED WAVE ACQUISITION METHOD AND MODEL PREDICTIVE CONTROL METHOD FOR SINGLE-PHASE CASCADED H-BRIDGE RECTIFIER

CROSS REFERENCE TO THE RELATED APPLICATIONS

This application is based upon and claims priority to Chinese Patent Application No. 202010116778.4, filed on Feb. 25, 2020, the entire contents of which are incorporated herein by reference.

TECHNICAL FIELD

The present invention relates to the field of power electronic control, and specifically, to a modified modulated wave acquisition method and a model predictive control (MPC) method for a single-phase cascaded H-bridge rectifier.

BACKGROUND

High-speed railways play an important role in modern transportation. Due to the shortcomings of conventional transformers, such as the large size and heavy weight, power electronic transformers have been widely used instead to meet the miniaturization and lightweight requirements for vehicle-mounted application. As the front-end input of a power electronic transformer, a single-phase cascaded H-bridge rectifier needs to operate stably.

Generally, the control methods for cascaded H-bridge rectifiers are divided into current control and power control. Currently, direct current control (DCC) includes hysteresis control, proportional integral (PI)-based instantaneous current control, proportional resonant (PR) current control, direct-quadrature (dq) coordinate system voltage-oriented current control, model predictive current control and so on. Power control includes model predictive power control, etc.

In recent years, MPC (including model predictive current control and model predictive voltage control) has been widely used because of its advantages of fast dynamic response and good power tracking characteristics. MPC relies on an accurate mathematical model. When there are parameter changes in the model or errors in mathematical modeling, the control effect will be less than optimal. In actual operation, due to equipment aging or transformer DC bias, inductance parameters in a circuit do not match inductance parameters in mathematical modeling, which reduces the accuracy of MPC.

SUMMARY

To solve the above deficiencies in the prior art, the present invention provides a modified modulated wave acquisition method and an MPC method for a single-phase cascaded H-bridge rectifier. The MPC method for the single-phase cascaded H-bridge rectifier can improve MPC accuracy.

In order to achieve the above objective, the present invention adopts the following technical solutions.

A modified modulated wave acquisition method is provided, comprising:

obtaining a modulated wave $u_{aba}$; and calculating a difference between the given value $i_{Nq}^*$ and the actual value $i_{Nq}$ of the q-axis component of a grid side current, inputting the result of the difference to a PI controller, and multiplying an output of the PI controller by cos ωt to obtain a modulated wave offset $\Delta u_{aba}$; and calculating a difference between the modulated wave $u_{aba}$ and the modulated wave offset $\Delta u_{aba}$; to obtain a modified modulation wave $u_{aba}'$, where ωt is a grid voltage phase in a sinusoidal case.

Further, to further improve the accuracy of the MPC method, a method for obtaining a proportional coefficient and an integral coefficient of the PI controller includes:

after setting the integral coefficient to 0, gradually increasing the proportional coefficient until the component is $i_{Nq}$ oscillates, then gradually reducing the proportional coefficient until the component is $i_{Nq}$ does not oscillate, and updating the proportional coefficient of the PI controller to the current proportional coefficient;

setting an initial value of the integral coefficient based on the proportional coefficient of the PI controller, gradually reducing the integral coefficient until the component is $i_{Nq}$ oscillates, then gradually increasing the integral coefficient until the component is $i_{Nq}$ does not oscillate and is $i_{Nq}$ equals $i^*_{Nq}$, and updating the integral coefficient of the PI controller to the current integral coefficient.

Further, a method for obtaining the modulated wave $u_{aba}$ includes: obtaining voltage components $u_{abd}$ and $u_{abq}$ of an input-side voltage of the rectifier in the dq coordinate system; and performing inverse transformation (d-q) on the voltage components $u_{abd}$ and $u_{abq}$ to obtain the modulated wave $u_{aba}$, so that decoupling control for active and reactive components is implemented.

Further, to facilitate the filter design, a method for obtaining the voltage components $u_{abd}$ and $u_{abq}$ includes:

obtaining a relationship between voltage and current on an AC (alternating current) side of the rectifier in a stationary αβ coordinate system according to a topology of a rectifier circuit and Kirchhoff's voltage law;

obtaining an expression of the voltage components $u_{abd}$ and $u_{abq}$ of the input-side voltage $u_{ab}$ of the rectifier in the dq coordinate system according to the relationship between the voltage and current on the AC side of the rectifier; and converting the expression of the voltage components $u_{abd}$ and $u_{abq}$ into an expression containing a switching period $T_s$ to obtain the voltage components $u_{abd}$ and $u_{abq}$.

In another aspect, the solution further provides an MPC method for a single-phase cascaded H-bridge rectifier, including: obtaining the modified modulated wave $u_{aba}'$ according to the method provided in the solution, where the component $i_{Nq}^*$ is 0, and then replacing the modulated wave $u_{aba}$ with the modified modulated wave $u_{aba}'$ to perform MPC for the single-phase cascaded H-bridge rectifier and improve, for example, the operating efficiency of electric vehicles.

The present invention has the following advantages.

In the present invention, the steady-state error caused by the mismatch of inductance parameters is eliminated by modifying modulated waves, and the control precision, the MPC accuracy, and the steady-state performance of a system are improved.

DETAILED DESCRIPTION OF THE EMBODIMENTS

The specific embodiments of the present invention will be described in detail below with reference to the drawings, so that those skilled in the art can understand the present invention. The described embodiments are only a part rather than all of the examples of the present invention. Without departing from the spirit and scope of the present invention defined by the appended claims, all other embodiments obtained by those skilled in the art without creative work shall fall within the protection scope of the claims.

A modified modulated wave acquisition method includes:
obtaining a modulated wave $u_{aba}$;
calculating a difference between the given value $i_{Nq}^*$ and the actual value $i_{Nq}$ of the q-axis component of a grid side current, and inputting the result of the difference to a PI controller;
multiplying an output of the PI controller by $\cos \omega t$ to obtain a modulated wave offset $\Delta u_{aba}$; and
calculating a difference between the modulated wave $u_{aba}$ and the modulated wave offset $\Delta u_{aba}$ to obtain a modified modulation wave $u_{aba}'$, where $\omega t$ is a grid voltage phase in a sinusoidal case.

During implementation, a preferred method for obtaining a proportional coefficient and an integral coefficient of the PI controller includes:
after setting the integral coefficient to 0, gradually increasing the proportional coefficient until the component $i_{Nq}$ oscillates, then gradually reducing the proportional coefficient until the component $i_{Nq}$ does not oscillate, and updating the proportional coefficient of the PI controller to the current proportional coefficient; and
setting an initial value of the integral coefficient based on the proportional coefficient of the PI controller, gradually reducing the integral coefficient until the component $i_{Nq}$ oscillates, then gradually increasing the integral coefficient until the component $i_{Nq}$ does not oscillate and $i_{Nq}$ equals $i^*_{Nq}$, and updating the integral coefficient of the PI controller to the current integral coefficient. Specifically, after the proportional coefficient of the PI controller is determined, the initial value of the integral coefficient is: 100×proportional coefficient of the PI controller.

Figure 1:
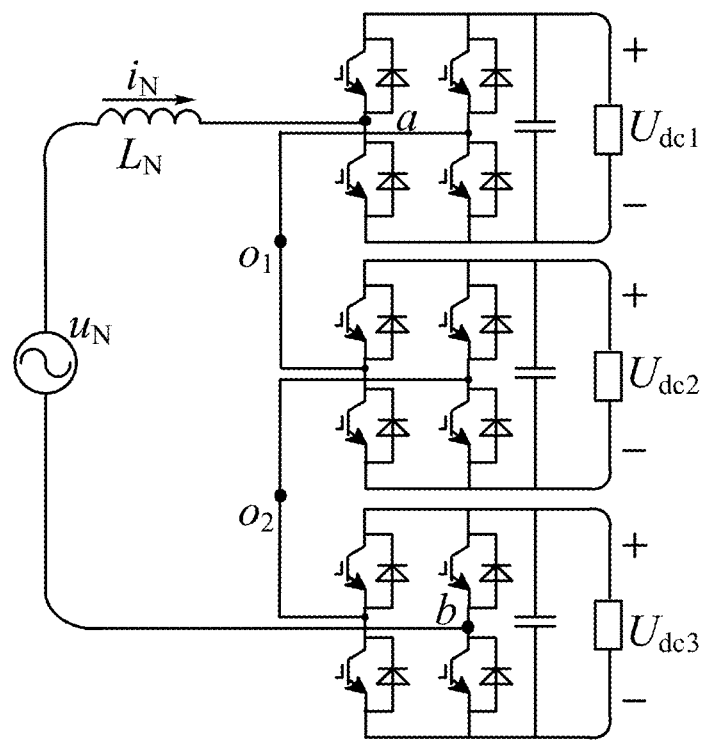
FIG. 1 is a topology diagram of a single-phase cascaded H-bridge seven-level rectifier.
Figure 2:
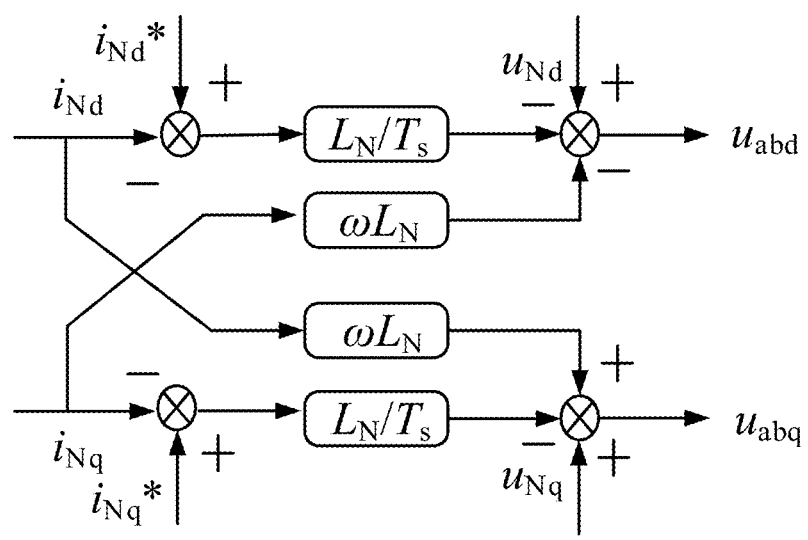
FIG. 2 is a principle block diagram of voltage components $u_{abd}$ and $u_{abq}$ of an input-side voltage of the single-phase cascaded H-bridge seven-level rectifier shown in FIG. 1 in a dq coordinate system.
Figure 3:
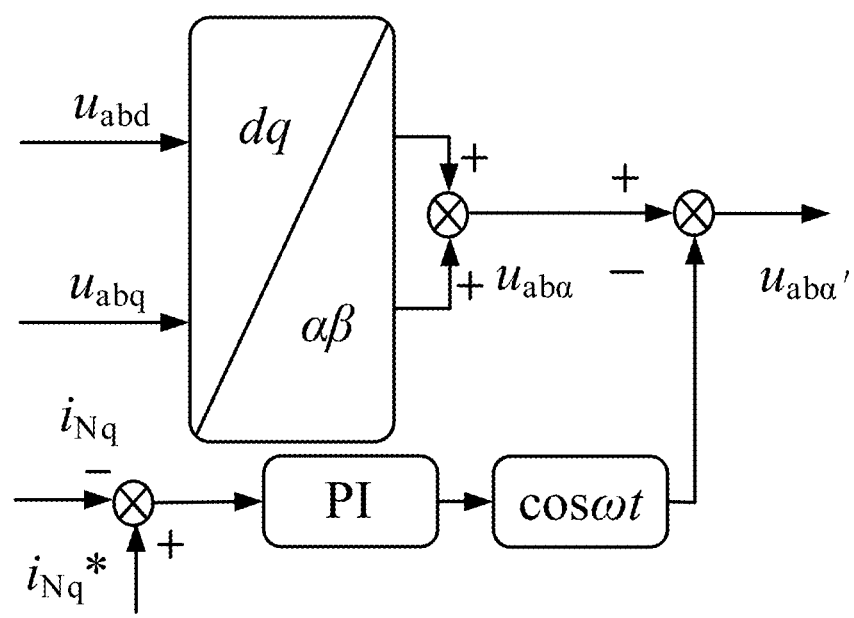
FIG. 3 is a principle block diagram of a modified modulated wave $u_{aba}'$ in an MPC method for the single-phase cascaded H-bridge seven-level rectifier shown in FIG. 1.

Taking a single-phase cascaded H-bridge rectifier shown in FIG. 1 as an example, a method for obtaining the modulated wave $u_{aba}$ includes:
obtaining voltage components $u_{abd}$ and $u_{abq}$ of an input-side voltage of the rectifier in a dq coordinate system;

obtaining a relationship between voltage and current on an AC side of the rectifier in a stationary αβ coordinate system according to a topology of a rectifier circuit and Kirchhoff's voltage law:

$$\begin{cases} u_{Nd} = L_N \dfrac{di_{Nd}}{dt} + \omega L_N i_{Nq} + u_{abd} \\ u_{Nq} = L_N \dfrac{di_{Nq}}{dt} - \omega L_N i_{Nd} + u_{abq} \end{cases}$$

where $u_{Nd}$ and $i_{Nd}$ are components of grid-side voltage and current on a d-axis; $u_{Nq}$ and $i_{Nq}$ are components of the grid-side voltage and current on a q-axis; ω is an angular frequency, and LN is an actual parameter of a grid-side inductance;

obtaining an expression of the voltage components $u_{abd}$ and $u_{abq}$ of the input-side voltage $u_{ab}$ of the rectifier in the dq coordinate system according to the relationship between the voltage and current on the AC side of the rectifier;

$$\begin{cases} u_{abd} = u_{Nd} - L_N \dfrac{di_{Nd}}{dt} - \omega L_N i_{Nq} \\ u_{abq} = u_{Nq} - L_N \dfrac{di_{Nq}}{dt} + \omega L_N i_{Nd} \end{cases}$$

converting the expression of the voltage components $u_{abd}$ and $u_{abq}$ into an expression containing a switching period $T_s$ to obtain the voltage components $u_{abd}$ and $u_{abq}$ (the switching period $T_s$ of the rectifier is fixed to facilitate filter design); the principles of the voltage components $u_{abd}$ and $u_{abq}$ are shown in FIG. 2:

$$\begin{cases} u_{abd} = u_{Nd} - \dfrac{L_N}{T_s}(i^*_{Nd} - i_{Nd}) - \omega L_N i_{Nq} \\ u_{abq} = u_{Nq} - \dfrac{L_N}{T_s}(i^*_{Nq} - i_{Nq}) + \omega L_N i_{Nd} \end{cases}$$

performing inverse transformation (d-q) on the voltage components $u_{abd}$ and $u_{abq}$ to obtain the modulated wave $u_{aba}$, wherein, the principle block diagram is shown in FIG. 3.

In another aspect, the solution further provides an MPC method for a single-phase cascaded H-bridge rectifier, including: obtaining the modified modulated wave $u_{aba}$ according to the method provided in this solution, where the component $i_{Nq}^*$ is 0, and replacing the modulated wave $u_{aba}$ with the modified modulated wave $u_{aba}$ to perform MPC for the single-phase cascaded H-bridge rectifier.

Figure 4:
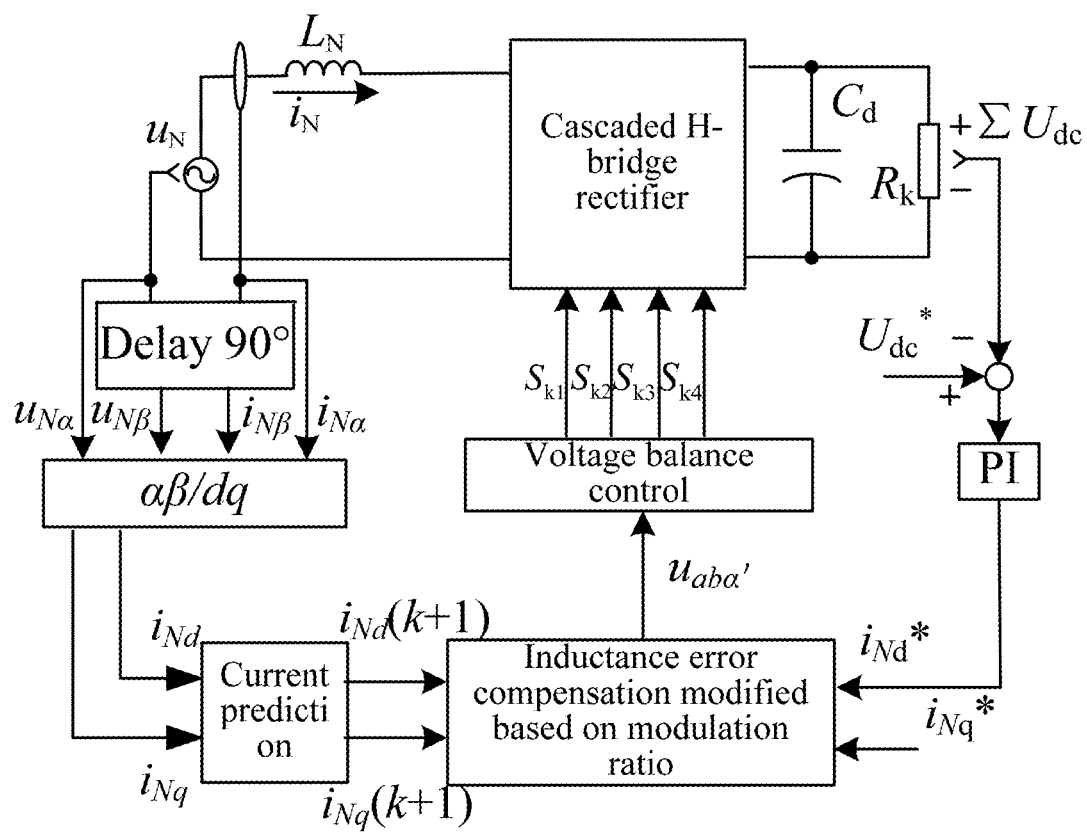
FIG. 4 is a principle block diagram of an MPC method for a single-phase cascaded H-bridge seven-level rectifier of a specific embodiment.
Figure 5:
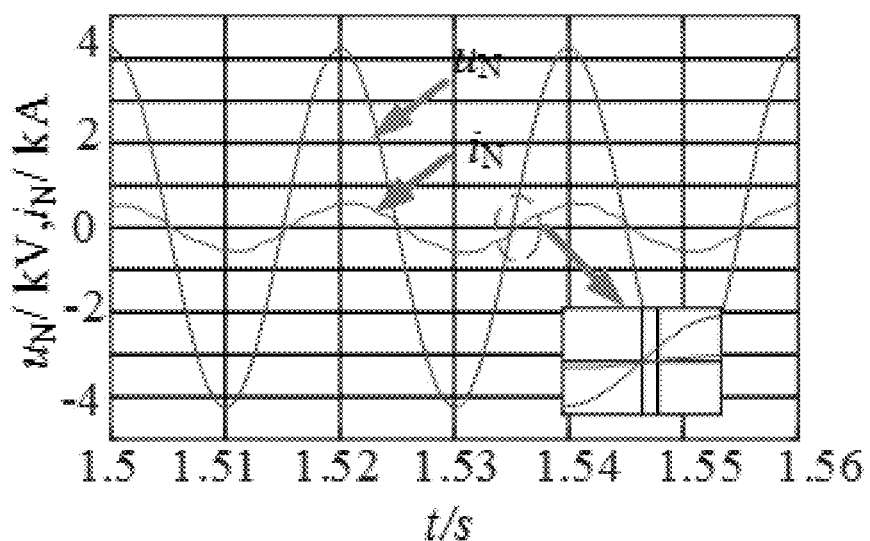
FIG. 5 is a diagram of grid-side voltage and current waveforms before inductance error compensation.
Figure 6:
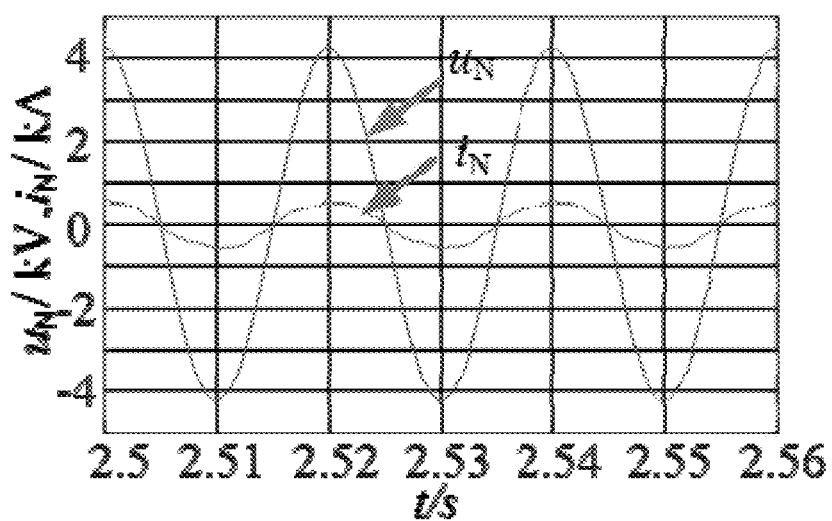
FIG. 6 is a diagram of grid-side voltage and current waveforms after inductance error compensation.
Figure 7:
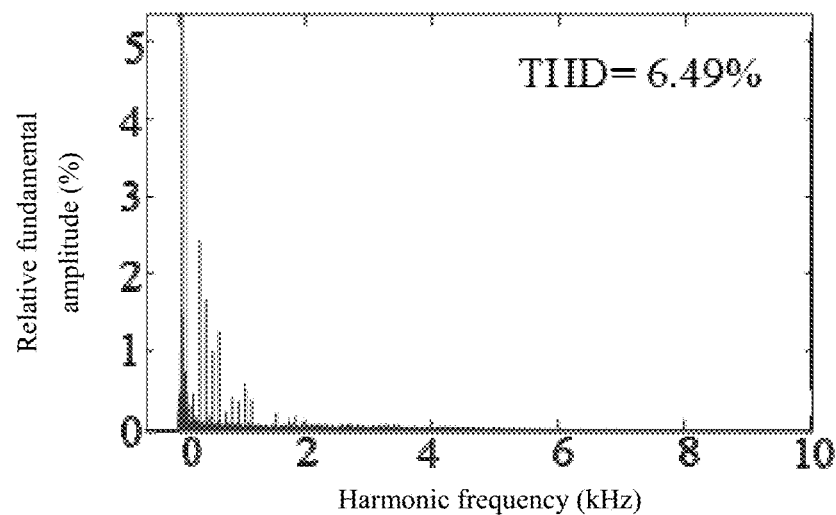
FIG. 7 is a harmonic content graph obtained through FFT analysis before inductance error compensation in steady state.
Figure 8:
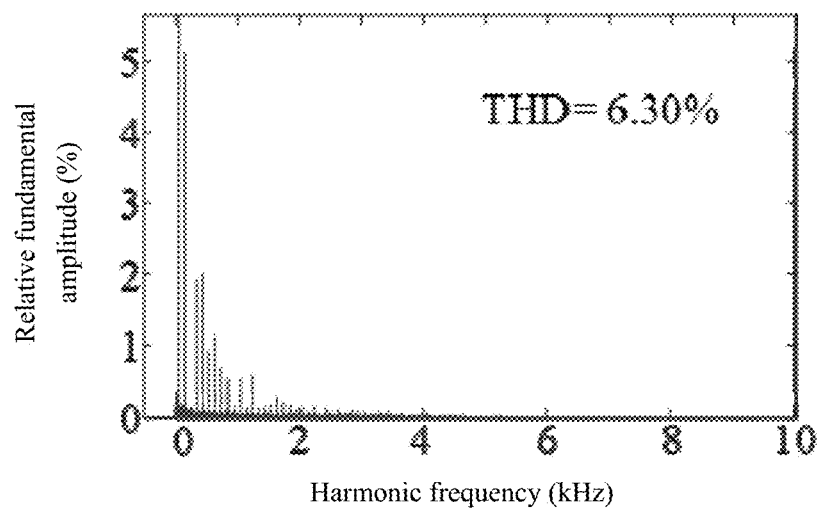
FIG. 8 is a harmonic content graph obtained through FFT analysis after inductance error compensation in steady state.
Figure 9:
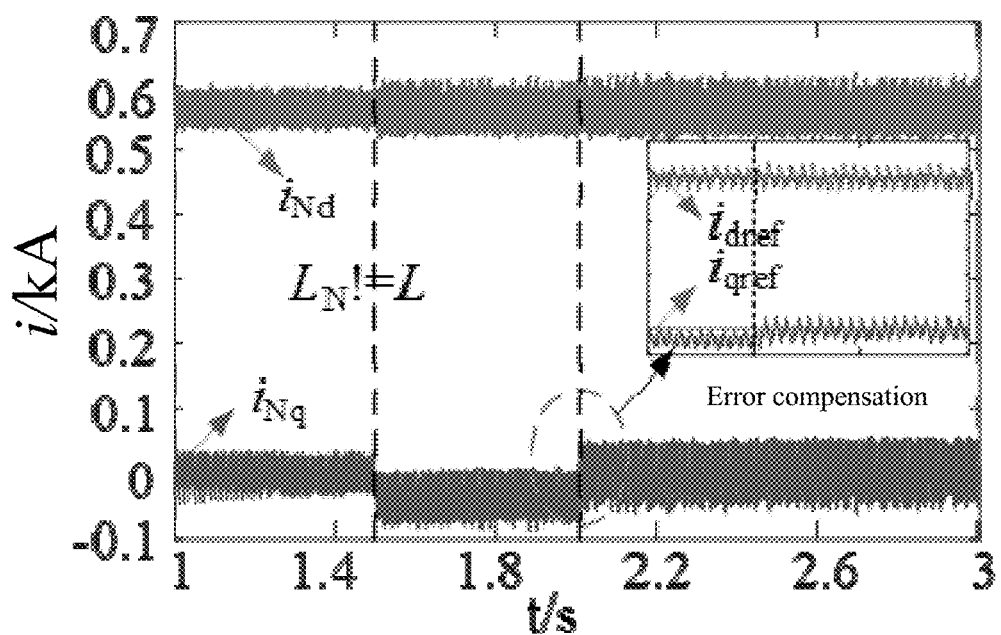
FIG. 9 is a diagram of waveforms of a d-axis component and a q-axis component of a grid-side current before and after inductance error compensation.

In an embodiment, an MPC method for a single-phase cascaded H-bridge rectifier is shown in FIG. 4. Results obtained before and after inductance error compensation (that is, before and after the MPC method is used) are shown in FIG. 5 to FIG. 9. As seen from FIG. 5 to FIG. 9, the MPC method can eliminate the steady-state error caused by the mismatch of inductance parameters, increase the control precision, improve the accuracy of MPC, and improve the steady-state performance of a system, such as an electric vehicle for example, on which a single-phase cascaded H-bridge rectifier is mounted.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes or devices, and any further applications of the principles of the invention as described herein, are contemplated as would normally occur to one skilled in the art to which the invention pertains.

What is claimed is:

1. A modified modulated wave acquisition method, comprising:
    obtaining a modulated wave $u_{aba}$;
    calculating a difference between a given value $i_{Nq}*$ and an actual value $i_{Nq}$ of the q-axis component of a grid side current, and inputting a result of the difference to a proportional integral (PI) controller;
    multiplying an output of the PI controller by cos ωt to obtain a modulated wave offset $\Delta u_{aba}$; and
    calculating a difference between the modulated wave $u_{aba}$ and the modulated wave offset $\Delta u_{aba}$ to obtain a modified modulation wave $u_{aba}'$, wherein ωt is a grid voltage phase in a sinusoidal case.

2. The modified modulated wave acquisition method according to claim 1, wherein a method for obtaining a proportional coefficient of the PI controller and an integral coefficient of the PI controller comprises:
    after setting the integral coefficient to 0, gradually increasing the proportional coefficient until the component $i_{Nq}$ of the instantaneous grid-side current on the q-axis oscillates, then gradually reducing the proportional coefficient until the component $i_{Nq}$ of the instantaneous grid-side current on the q-axis does not oscillate, and updating the proportional coefficient of the PI controller to a current proportional coefficient; and
    setting an initial value of the integral coefficient based on the proportional coefficient of the PI controller, gradually reducing the integral coefficient until the component $i_{Nq}$ of the instantaneous grid-side current on the q-axis oscillates, then gradually increasing the integral coefficient until the component $i_{Nq}$ of the instantaneous grid-side current on the q-axis does not oscillate and $i_{Nq}$ equals $i_{Nq}*$, and updating the integral coefficient of the PI controller to the current integral coefficient.

3. The modified modulated wave acquisition method according to claim 1, wherein a method for obtaining the modulated wave $u_{aba}$ comprises:
    obtaining voltage components $u_{abd}$ and $u_{abq}$ of an input-side voltage $u_{ab}$ of a rectifier in a dq coordinate system; and
    performing direct-quadrature (d-q) inverse transformation on the voltage components $u_{abd}$ and $u_{abq}$ to obtain the modulated wave $u_{aba}$.

4. The modified modulated wave acquisition method according to claim 2, wherein a method for obtaining the modulated wave $u_{aba}$ comprises:
    obtaining voltage components $u_{abd}$ and $u_{abq}$ of an input-side voltage $u_{ab}$ of a rectifier in a dq coordinate system; and
    performing d-q inverse transformation on the voltage components $u_{abd}$ and $u_{abq}$ to obtain the modulated wave $u_{aba}$.

5. The modified modulated wave acquisition method according to claim 3, wherein a method for obtaining the voltage components $u_{abd}$ and $u_{abq}$ comprises:
    obtaining a relationship between a voltage and a current on an AC side of the rectifier in a stationary αβ coordinate system according to a topology of a rectifier circuit and Kirchhoff's voltage law;
    obtaining an expression of the voltage components $u_{abd}$ and $u_{abq}$ of the input-side voltage $u_{ab}$ of the rectifier in the dq coordinate system according to the relationship between the voltage and the current on the AC side of the rectifier; and
    converting the expression of the voltage components $u_{abd}$ and $u_{abq}$ of the input-side voltage $u_{ab}$ of the rectifier in the dq coordinate system into an expression containing a switching period $T_s$ to obtain the voltage components $u_{abd}$ and $u_{abq}$.

6. A model predictive control (MPC) method for a single-phase cascaded H-bridge rectifier, comprising: obtaining a modified modulated wave $u_{aba}'$ by using the method according to claim 1, wherein a component $i_{Nq}*$ is 0; and replacing a modulated wave $u_{aba}$ with the modified modulated wave $u_{aba}'$ to perform MPC for the single-phase cascaded H-bridge rectifier.

7. The model predictive control (MPC) method for a single-phase cascaded H-bridge rectifier according to claim 6, wherein
    a method for obtaining a proportional coefficient of the PI controller and an integral coefficient of the PI controller comprises:
    after setting the integral coefficient to 0, gradually increasing the proportional coefficient until the component $i_{Nq}$ of the instantaneous grid-side current on the q-axis oscillates, then gradually reducing the proportional coefficient until the component $i_{Nq}$ of the instantaneous grid-side current on the q-axis does not oscillate, and updating the proportional coefficient of the PI controller to a current proportional coefficient; and
    setting an initial value of the integral coefficient based on the proportional coefficient of the PI controller, gradually reducing the integral coefficient until the component $i_{Nq}$ of the instantaneous grid-side current on the q-axis oscillates, then gradually increasing the integral coefficient until the component $i_{Nq}$ of the instantaneous grid-side current on the q-axis does not oscillate and $i_{Nq}$ equals $i_{Nq}*$, and updating the integral coefficient of the PI controller to the current integral coefficient.

8. The model predictive control (MPC) method for a single-phase cascaded H-bridge rectifier according to claim 6, wherein
    a method for obtaining the modulated wave $u_{aba}$ comprises:
    obtaining voltage components $u_{abd}$ and $u_{abq}$ of an input-side voltage $u_{ab}$ of a rectifier in a dq coordinate system; and
    performing d-q inverse transformation on the voltage components $u_{abd}$ and $u_{abq}$ to obtain the modulated wave $u_{aba}$.

9. The model predictive control (MPC) method for a single-phase cascaded H-bridge rectifier according to claim 8, wherein
    a method for obtaining the voltage components $u_{abd}$ and $u_{abq}$ comprises:
    obtaining a relationship between a voltage and a current on an AC side of the rectifier in a stationary αβ coordinate system according to a topology of a rectifier circuit and Kirchhoff's voltage law;
    obtaining an expression of the voltage components $u_{abd}$ and $u_{abq}$ of the input-side voltage $u_{ab}$ of the rectifier in the dq coordinate system according to the relationship between the voltage and the current on the AC side of the rectifier; and
    converting the expression of the voltage components $u_{abd}$ and $u_{abq}$ of the input-side voltage $u_{ab}$ of the rectifier in the dq coordinate system into an expression containing a switching period $T_s$ to obtain the voltage components $u_{abd}$ and $u_{abq}$.

* * * * *